(12) United States Patent
Nakazaki et al.

(10) Patent No.: US 12,067,095 B2
(45) Date of Patent: Aug. 20, 2024

(54) BIOMETRIC AUTHENTICATION SYSTEM, BIOMETRIC AUTHENTICATION METHOD, AND STORAGE MEDIUM

(71) Applicant: HITACHI, LTD., Tokyo (JP)

(72) Inventors: Keiichiro Nakazaki, Tokyo (JP); Naoto Miura, Tokyo (JP); Akio Nagasaka, Tokyo (JP); Yusuke Matsuda, Tokyo (JP); Yo Nonomura, Tokyo (JP); Takafumi Miyatake, Tokyo (JP)

(73) Assignee: HITACHI, LTD., Tokyo (JP)

( * ) Notice: Subject to any disclaimer, the term of this patent is extended or adjusted under 35 U.S.C. 154(b) by 509 days.

(21) Appl. No.: 17/275,250

(22) PCT Filed: Aug. 26, 2019

(86) PCT No.: PCT/JP2019/033352
§ 371 (c)(1),
(2) Date: Mar. 11, 2021

(87) PCT Pub. No.: WO2020/071008
PCT Pub. Date: Apr. 9, 2020

(65) Prior Publication Data
US 2022/0043895 A1    Feb. 10, 2022

(30) Foreign Application Priority Data

Oct. 3, 2018 (JP) ................. 2018-188420

(51) Int. Cl.
*G06F 21/00* (2013.01)
*G06F 21/32* (2013.01)
(Continued)

(52) U.S. Cl.
CPC ............... *G06F 21/32* (2013.01); *G06N 3/08* (2013.01); *G06V 10/454* (2022.01); *G06V 10/82* (2022.01);
(Continued)

(58) Field of Classification Search
CPC ........ G06F 21/32; G06V 40/67; G06V 40/12; G06V 10/454; G06V 40/1365;
(Continued)

(56) References Cited

U.S. PATENT DOCUMENTS

2007/0288748 A1   12/2007   Kakiuchi et al.
2009/0251560 A1*  10/2009   Azar ................. G07C 9/37
                                                     348/E5.022
(Continued)

FOREIGN PATENT DOCUMENTS

CN   101043336 A   9/2007
CN   102332093 A   1/2012
(Continued)

OTHER PUBLICATIONS

Machine Translation of JP2009211357 A (Year: 2009).*
(Continued)

*Primary Examiner* — Yogesh Paliwal
(74) *Attorney, Agent, or Firm* — Volpe Koenig

(57) ABSTRACT

A biometric authentication system, including an image input unit configured to obtain an image by imaging a living body, a storage unit configured to store registration information relating to a plurality of biological features obtained from a biological region of an image of each person, and an authentication processing unit configured to process the biological region of the image obtained by the image input unit to execute biometric authentication based on the registration information, wherein the plurality of biological features obtained from the biological region of the each person are a plurality of biological features having a low pattern correlation with one another, and wherein the authentication processing unit is configured to combine the plurality of biological features having a low pattern correlation with one (Continued)

another, which are obtained by processing the image, to execute the biometric authentication.

11 Claims, 14 Drawing Sheets

(51) Int. Cl.
*G06N 3/08* (2023.01)
*G06V 10/44* (2022.01)
*G06V 10/82* (2022.01)
*G06V 40/12* (2022.01)
*G06V 40/16* (2022.01)
*G06V 40/40* (2022.01)
*G06V 40/50* (2022.01)
*G06V 40/60* (2022.01)
*G06V 40/70* (2022.01)

(52) U.S. Cl.
CPC .......... *G06V 40/12* (2022.01); *G06V 40/1365* (2022.01); *G06V 40/1388* (2022.01); *G06V 40/16* (2022.01); *G06V 40/172* (2022.01); *G06V 40/45* (2022.01); *G06V 40/50* (2022.01); *G06V 40/67* (2022.01); *G06V 40/70* (2022.01)

(58) Field of Classification Search
CPC ...... G06V 40/172; G06V 10/82; G06V 40/16; G06V 40/70; G06V 40/50; G06V 40/1388; G06V 40/45; G06N 3/08
See application file for complete search history.

(56) References Cited

U.S. PATENT DOCUMENTS

| | | | |
|---|---|---|---|
| 2013/0251213 A1 | 9/2013 | Nada et al. | |
| 2015/0116086 A1 | 4/2015 | Kim et al. | |
| 2015/0379254 A1 | 12/2015 | Matsuda et al. | |
| 2016/0379041 A1 | 12/2016 | Rhee et al. | |
| 2016/0379044 A1 | 12/2016 | Tang et al. | |
| 2017/0046563 A1* | 2/2017 | Kim | G06F 18/217 |
| 2018/0150671 A1 | 5/2018 | Choo et al. | |
| 2019/0005217 A1* | 1/2019 | Kim | G06F 18/2411 |

FOREIGN PATENT DOCUMENTS

| | | | |
|---|---|---|---|
| CN | 102592110 A | 7/2012 | |
| CN | 104615993 A | 5/2015 | |
| CN | 105139546 A | 12/2015 | |
| CN | 105212942 A | 1/2016 | |
| CN | 105389703 A | 3/2016 | |
| CN | 105718874 A | 6/2016 | |
| EP | 2453385 A2 | 5/2012 | |
| EP | 2642428 A2 | 9/2013 | |
| JP | 07-141506 A | 6/1995 | |
| JP | 2007241371 A | 9/2007 | |
| JP | 2009-211357 A | 9/2009 | |
| JP | 2009211357 A | * | 9/2009 |
| JP | 2013-200673 A | 10/2013 | |
| JP | 2015-185042 A | 10/2015 | |
| JP | 2016-096987 A | 5/2016 | |
| JP | 2016-538656 A | 12/2016 | |
| JP | 2017-091186 A | 5/2017 | |
| JP | 2018-087973 A | 6/2018 | |
| JP | 2018-106618 A | 7/2018 | |
| KR | 20040082674 A | 9/2004 | |
| KR | 10-2014-0089810 A | 7/2014 | |
| KR | 10-2015-0049550 A | 5/2015 | |
| KR | 10-2017-0000748 A | 1/2017 | |
| KR | 20170000128 A | 1/2017 | |
| WO | 2015/078018 A1 | 6/2015 | |
| WO | 2015/078018 A8 | 6/2015 | |

OTHER PUBLICATIONS

International Search Report, PCT/JP2019/033352, Oct. 8, 2019, 2 pgs.
Japanese Office Action issued on Nov. 8, 2022 for Japanese Patent Application No. 2018-188420.
Partial Supplementary European Search Report issued on Jun. 22, 2022 for European Patent Application No. 19869851.6.
Daugman, "Iris Recognition", Paper, University of Cambridge, Cambridge, U.K., (2008).
Sidlauskas et al., "Hand Geometry Recognition", Article, Ingersoll Rand Recognition Systems, California, U.S.A., (2008).
Zheng et al., "Projective Invariant Hand Geometry: An Overview", Article, Department of Electrical and Computer Engineering, University of Colorado at Colorado Springs, Colorado Springs, Colorado, U.S.A., (2005).
Zheng et al., "Application of Projective Invariants in Hand Geometry Biometrics", Article, IEEE Transactions on Information Forensics and Security, University of Colorado at Colorado Springs, Colorado Springs, Colorado, U.S.A., (2007).
Radu et al., "Are Two Eyes Better Than One? An Experimental Investigation on Dual Iris Recognition", Paper, University of Kent, School of Engineering and Digital Arts, Kent, U.K., (2010).
Korean Office Action issued on Jul. 4, 2022 for Korean Patent Application No. 10-2021-7005979.
Japanese Office Action issued on May 24, 2022 for Japanese Patent Application No. 2018-188420.
Extended European Search Report dated Nov. 28, 2022 for European Patent Application No. 19869851.6.
Lin, "Contactless 3D Fingerprint Identification and Contactless to Contact-Based Fingerprint Matching", Thesis, The Hong Kong Polytechnic University, Hong Kong, China, (2018).
Schroff et al., "FaceNet: A Unified Embedding for Face Recognition and Clustering", Paper, The Computer Vision Foundation, (2015).
Xie et al., "Finger vein identification using Convolutional Neural Network and supervised discrete hashing," Pattern Recognition Letters, vol. 119, (2019).
Xie et al., "Finger Vein Identification Using Convolutional Neural Network and Supervised Discrete Hashing", In: Bhanu, B., Kumar, A. (eds) Deep Learning for Biometrics. Advances in Computer Vision and Pattern Recognition. Springer, Cham. (2017).
State Intellectual Property Office of the People's Republic of China, First Office Action Issued on Dec. 6, 2023 for Chinese Patent Application No. 201980057116.X.

* cited by examiner

BIOMETRIC AUTHENTICATION SYSTEM, BIOMETRIC AUTHENTICATION METHOD, AND STORAGE MEDIUM

CLAIM OF PRIORITY

The present application claims priority from Japanese patent application JP2018-188420, filed on Oct. 3, 2018, the content of which is hereby incorporated by reference into this application.

BACKGROUND OF THE INVENTION

This invention relates to a technology of authenticating an individual with use of a living body.

Hitherto, as an individual authentication method for entrance/exit control, attendance management, and access control, for example, control of login to a computer, there have been widely used knowledge-based authentication using an identification (ID) and a password (PW) and property-based authentication using a physical key or an IC card, for example. However, those authentication methods have a risk of being forgotten or lost. As a solution thereto, biometric authentication free from such a risk has been recently utilized. The biometric authentication uses an apparatus equipped with a sensor configured to read biometric information. The biometric authentication is utilized for every access control in, for example, a personal computer (PC), a bank automated teller machine (ATM), an entrance to a room, or a locker. In particular, in recent years, along with the widespread use of portable terminals such as smartphones and tablet computers, there are increasing examples in which biometric authentication is executed on the portable terminal. Regarding the biometric authentication executed on such a portable terminal as used by everyone, authentication becomes difficult in some cases depending on biometric condition changes such as whether with or without glasses or a mask, a skin problem, and poor blood circulation. To address this, there is a demand to enable user authentication with the use of a plurality of non-overlapping living body sites, for example, with the use of fingerprint authentication in place of face authentication when a user has a mask on, and with the use of face authentication when a user has a skin trouble. In this case, it is desired to extract biometric features of a plurality of biological tissues at the same time without increasing the number of sensors required for target living body sites, that is, with the use of a single and general-purpose sensor, for example, a visible light camera. Further, it is important to suppress reduction in authentication accuracy accompanying a change in position or posture of the living body that occurs every time a user uses the authentication apparatus, and also to suppress the change itself in position or posture.

In JP 2016-96987 A, there is disclosed a technology of extracting a plurality of overlapping feature amounts from an image obtained by imaging the finger, thereby executing authentication robustly against the change in position or posture of the living body.

In JP 2017-91186 A, there is disclosed a technology of guiding the finger to an optimum presentation position and posture so as to suppress a change thereof, and under this state, extracting from the captured image a feature amount for authentication.

SUMMARY OF THE INVENTION

In order to achieve a biometric authentication apparatus with high usability and high accuracy, it is important that a plurality of non-overlapping biometric features can be extracted from data obtained with a sensor and can be used for authentication.

In JP 2016-96987 A, there is proposed a technology of extracting, from an image obtained by illuminating the finger with a light source and imaging reflected light thereof, a plurality of overlapping biometric features based on information about distribution of pigment concentration relating to a plurality of overlapping and internal biometric features of the finger, thereby ensuring high-accuracy authentication. However, there is no description about a problem in that the plurality of biometric features cannot be easily extracted from the captured image depending on constraints on the light source and the sensor.

In JP 2017-91186 A, there is proposed a technology of guiding the finger to an optimum presentation position and under this state, illuminating the finger with a plurality of light sources having different wavelengths and imaging reflected light thereof to obtain an image, and then extracting a feature amount from the image for authentication. However, there is no description about a method of guiding a plurality of non-overlapping living body sites such as the face as well as the finger to the optimum presentation position and imaging the living body sites without being blocked by one another.

In view of the above-mentioned problem, this invention has an object to provide a technology of achieving a biometric authentication apparatus with which it is possible to guide a plurality of non-overlapping living body sites to an optimum presentation position and image the living body sites without being blocked by one another, and to obtain a plurality of biometric feature amounts from the captured image and execute matching of the plurality of biometric feature amounts, thereby enabling stable and highly accurate authentication.

To solve at least one of the foregoing problems, one aspect of this invention is a biometric authentication system, comprising: an image input unit configured to obtain an image by imaging a living body; a storage unit configured to store registration information relating to a plurality of biological features obtained from a biological region of an image of each person; and an authentication processing unit configured to process the biological region of the image obtained by the image input unit to execute biometric authentication based on the registration information, wherein the plurality of biological features obtained from the biological region of the each person are a plurality of biological features having a low pattern correlation with one another, and wherein the authentication processing unit is configured to combine the plurality of biological features having a low pattern correlation with one another, which are obtained by processing the image, to execute the biometric authentication.

According to at least one aspect of this invention, in the biometric authentication system, the plurality of biometric feature amounts having a low correlation with one another are extracted from the images obtained through one imaging operation, and the plurality of biometric feature amounts are subjected to matching, thereby enabling stable and highly accurate authentication.

Problems, configurations, and effects other than the above-mentioned ones become apparent from the following description of embodiments.

DETAILED DESCRIPTION OF THE PREFERRED EMBODIMENTS

Now, referring to the accompanying drawings, description is given of at least one embodiment of this invention. The accompanying drawings are illustrations of specific embodiments in conformity with the principle of this invention, but those are used for the understanding of this invention and never used to limit the interpretation of this invention. Further, components common across the respective drawings are denoted by the same reference symbols.

First Embodiment

Figure 1A:
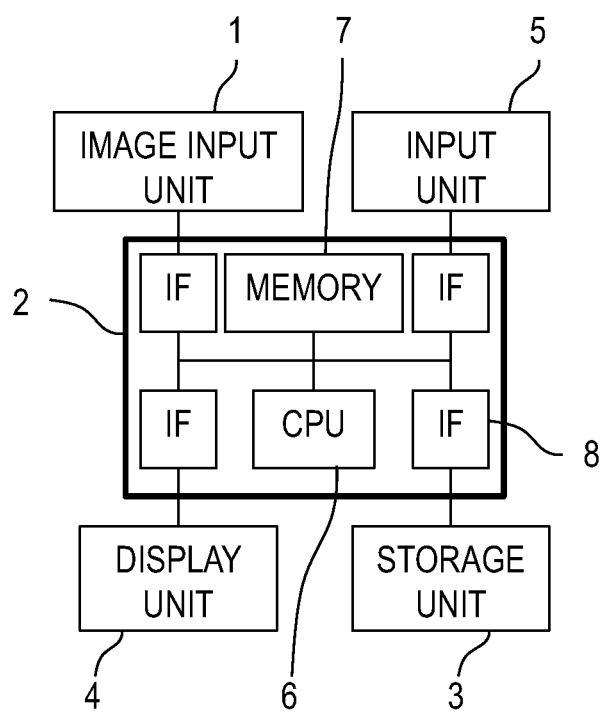
FIG. 1A is a block diagram for illustrating an overall configuration of a biometric authentication system for use with a finger and a face according to a first embodiment of this invention.

FIG. 1A is a block diagram for illustrating an overall configuration of a biometric authentication system for use with a finger and a face according to a first embodiment of this invention.

It should be noted that this invention may be, needless to say, configured not only as a system but also as an apparatus having all or some of components of FIG. 1A installed in its housing. In this case, the apparatus of this invention may be an individual authentication apparatus that encompasses authentication processing. Alternatively, the apparatus of this invention may be a biometric image obtaining apparatus devoted to obtaining biometric images with the authentication processing being executed outside the apparatus.

The biometric authentication system of the first embodiment includes an image input unit 1, an authentication processing unit 2, a storage unit 3, a display unit 4, and an input unit 5.

The image input unit 1 is, for example, a color camera, and is configured to obtain an image including biometric features from the living body of a person to be authenticated, and input the obtained image to the authentication processing unit 2. The image input unit 1 may be hereinafter also referred to as "camera 1."

The authentication processing unit 2 is configured to execute image processing on the image input from the image input unit 1, and execute authentication processing. It should be noted that the image input unit 1 may be also incorporated in an image processing function of the authentication processing unit 2 to serve as an image processing unit. In any case, the authentication processing unit 2 has the image processing function.

FIG. 1A is also a diagram for illustrating the configuration of the authentication processing unit 2. The authentication processing unit 2 includes a central processing unit (CPU) 6, a memory 7, and various types of interfaces (IFs) 8.

Figure 1B:
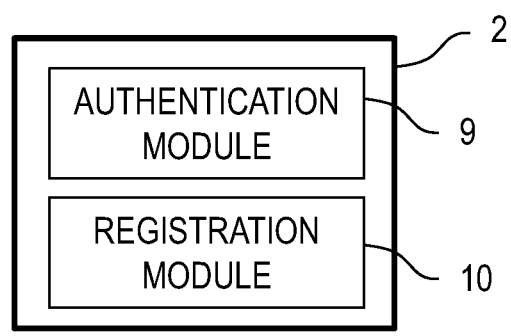
FIG. 1B is a functional block diagram of an authentication processing unit of the first embodiment.

The CPU 6 is configured to execute programs stored in the memory 7 to execute various types of processing. As described below, processing executed by the biometric authentication system of the first embodiment with the use of functions of an authentication module 9 or a registration module 10 illustrated in FIG. 1B is actually executed by the CPU 6 in accordance with the program stored in the memory 7. The memory 7 is configured to store the programs to be executed by the CPU 6. The memory 7 is also configured to temporarily store an image input from the image input unit 1.

The interfaces 8 are configured to couple the authentication processing unit 2 and external apparatus. Specifically, the interfaces 8 are coupled to, for example, the image input unit 1, the storage unit 3, the display unit 4, and the input unit 5.

FIG. 1B is a functional block diagram of the authentication processing unit 2 of the first embodiment.

The authentication processing unit 2 includes the authentication module 9 and the registration module 10. The authentication module 9 is configured to compare the data input from the image input unit 1 and registration data registered in the storage unit 3, to authenticate a user. The registration module 10 is configured to create registration data from the image obtained by the image input unit 1, and store the created data in the storage unit 3. For example, processing of FIG. 3 and processing of FIG. 4, which are to be described later, may be also executed by the registration module 10 and the authentication module 9, respectively, optionally controlling the image input unit 1, the storage unit 3, the display unit 4, and the input unit 5.

The storage unit 3 is configured to store, in advance, registration data about a user. The registration data is information for user matching, and is, for example, an image of a finger vein pattern. In general, the image of the finger vein pattern is an image obtained by imaging blood vessels (finger veins) mainly distributed beneath the finger skin on the palm side in the form of dark shadow patterns.

The display unit 4 is, for example, a display apparatus, and serves as an output apparatus configured to display information received from the authentication processing unit 2. The display unit 4 may be hereinafter also referred to as "display 4." The input unit 5 is, for example, a keyboard, and is configured to transmit information input by a user to the authentication processing unit 2.

Figure 2:
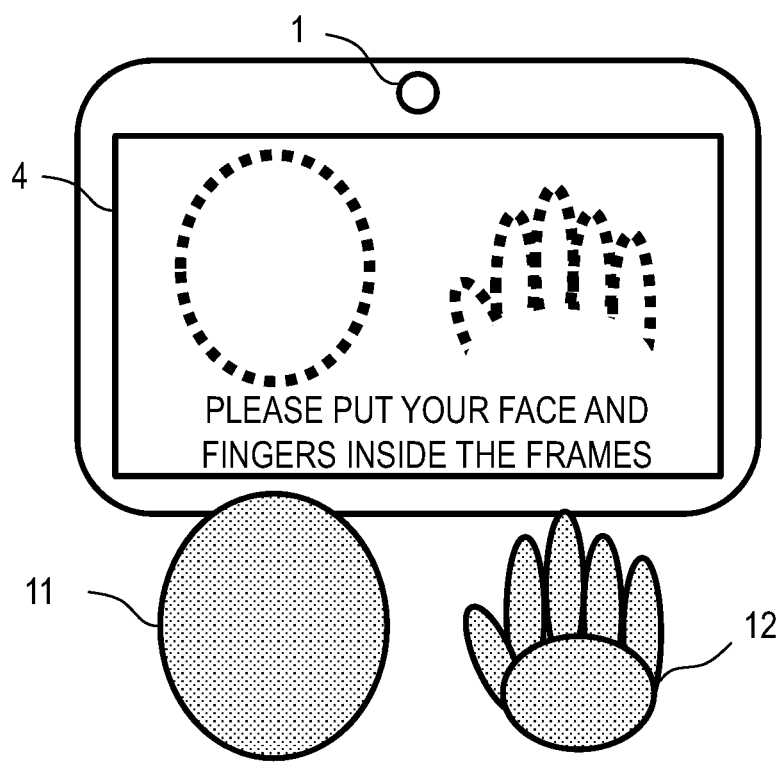
FIG. 2 is a diagram for illustrating an example of how to execute authentication with the use of the biometric authentication system of the first embodiment.

FIG. 2 is a diagram for illustrating an example of how to execute authentication with the use of the biometric authentication system of the first embodiment.

Specifically, FIG. 2 is an illustration of how to execute authentication with the use of a tablet PC having the biometric authentication system installed therein. In the first embodiment, the person to be authenticated (specifically, the user) presents the living body, for example, a face 11 and a hand 12, following a guide image and message displayed on the display unit 4, for example, a display of the tablet PC. The condition of the living body is imaged by the image input unit 1, for example, an in-camera of the tablet PC, and subjected to authentication processing.

Figure 3:
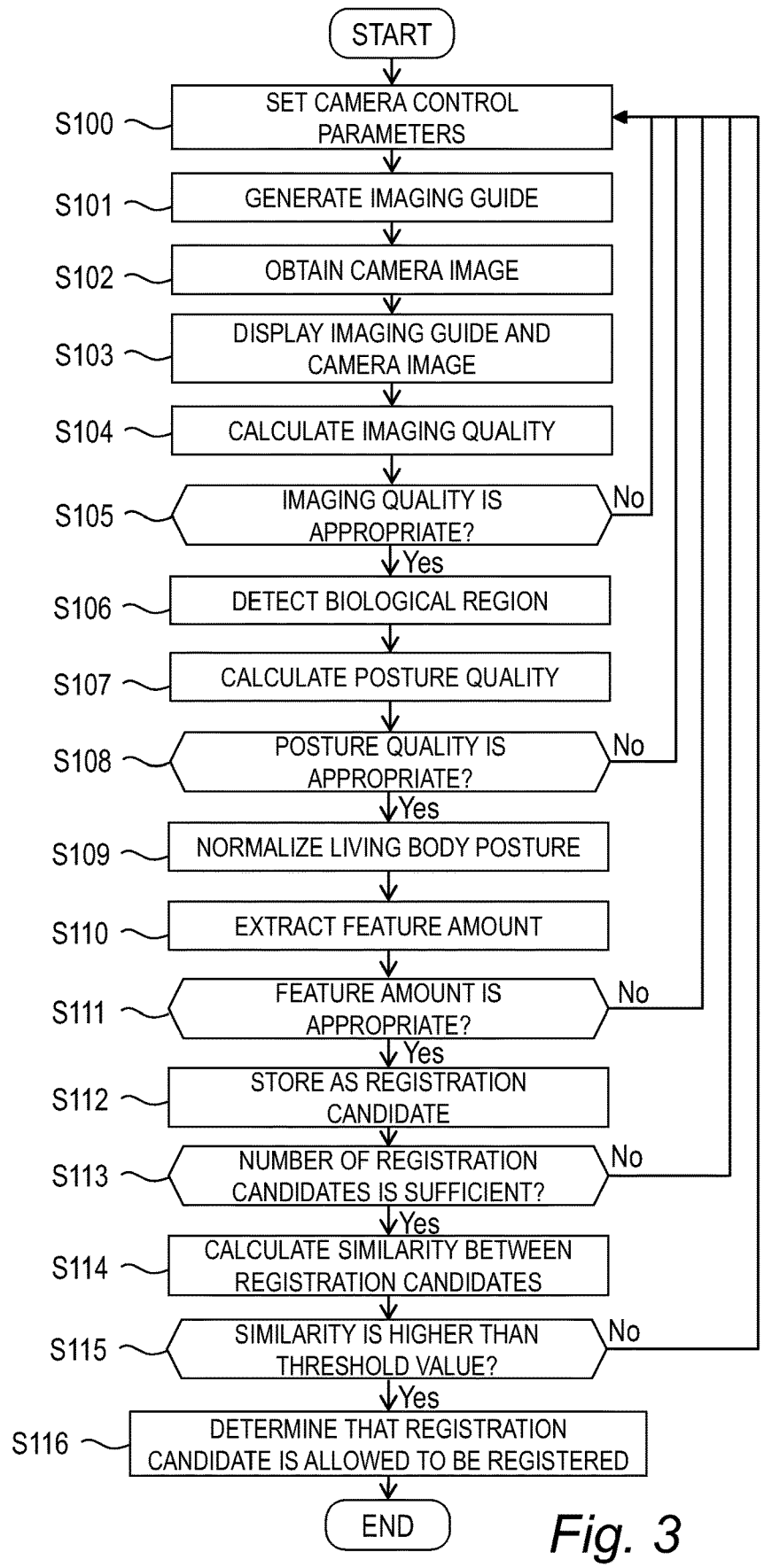
FIG. 3 is a flowchart for illustrating processing executed at the time of registration by the biometric authentication system of the first embodiment.

FIG. 3 is a flowchart for illustrating processing executed at the time of registration by the biometric authentication system of the first embodiment.

First, the system sets parameters (camera control parameter) used to control the image input unit 1, such as focus, white balance, exposure, and gain, so as to obtain an image having proper quality (Step S100). Those parameters may employ a predetermined fixed value, or an optimum value in a past imaging operation, or under video photography, a value determined by a certain rule based on an image obtained in any previous frame and a camera control parameter.

Next, the system images the living body, for example, the finger and the face with the camera to obtain an image thereof (Step S101). Subsequently, the system generates a guide image of a living body shape as a sample for presentation and a guide message that instructs how to present the living body in order for the person to be authenticated to present the living body in suitable position and posture (Step S102). The guide image may indicate a part or all of the outline of the living body. As another example, the presented living body may be detected, and then a rectangle or another shape consistent with or inclusive of the outline of the detected living body may be displayed as the guide image.

Next, the system displays the guide image and message on the display (Step S103). For example, FIG. 2 is an illustration of an example of displaying dotted guide images indicating the outlines of the head and the finger, respectively, and a message "Please put your face and fingers inside the frames" in order for the person to be authenticated to present the face and the fingers as the living body. In this case, when the guide image is displayed on an image of the living body obtained with the camera in a superimposed manner, the person to be authenticated can recognize how different his or her own way to present the living body is from a proper way therefor, and thus can present the living body more properly.

Next, the authentication processing unit 2 calculates an imaging quality value from the captured image and the camera control parameters, for example (Step S104). This quality value is calculated by a certain rule based on at least one of a focus, an exposure control value, or a luminance value of an obtained image, for example. For example, a quality value of the focus may be set as a luminance contrast in a region of the obtained image at the same position as the guide image, and a region of the obtained image from which the living body has been detected. Further, for example, a quality value of the exposure may be set as a variation amount between an exposure control value in any previous frame and an exposure control value in a current frame. Still further, a quality value relating to the luminance of the obtained image may be set as an average luminance value in the region of the obtained image at the same position as the guide image, or the region of the obtained image from which the living body has been detected.

Next, the authentication processing unit 2 evaluates appropriateness of each quality value based on a difference between the above-mentioned quality values and corresponding appropriate values, for example (Step S105). When the quality value is not appropriate, the processing proceeds to the setting of camera control parameters (Step S100). When the quality value is appropriate, the authentication processing unit 2 detects a biological region from the obtained image (Step S106).

The detection of the biological region may be also executed by extracting a region target for extraction of a feature amount of the face and the finger, for example, from the detected biological region with the use of the semantic segmentation method for classifying pixels of the obtained image into the biological region and other regions, for example. As another example, the object localization method for extracting a rectangular region inclusive of the biological region from the obtained image may be applied. As still another example, the biological region may be extracted by any other method.

Next, the authentication processing unit 2 calculates a length, a width, an angle, and other posture information of the detected finger from the extracted biological region, for example, and then calculates differences from appropriate values thereof as quality values (Step S107). Subsequently, the authentication processing unit 2 determines whether the calculated quality value of the posture is appropriate (Step S108). When the calculated quality value of the posture is not appropriate, the processing proceeds to the setting of camera control parameters (Step S100). When the calculated quality value of the posture is appropriate, the authentication processing unit 2 normalizes the living body posture (Step S109).

The normalization of the posture is to clip a part of the detected finger region into a smaller size or extend the region through interpolation so as to adjust the finger length to a certain length, to enlarge or reduce the detected finger region so as to set a width of the finger to be constant, or to rotate the finger region so as to adjust the finger angle to a certain angle, for example.

Next, the authentication processing unit 2 extracts a feature amount for matching, from the biological region having been subjected to posture normalization (Step S110). The extraction of a feature amount may be executed by extracting a fingerprint, a feature point of the face, or a line pattern of the vein, for example, from the biological region. As another example, a machine learning technique, for example, a convolutional neural network (CNN), may be used to design automatic extraction of a feature amount from the biological region.

Next, the authentication processing unit 2 determines whether the extracted feature amount is appropriate (Step S111). For example, the authentication processing unit 2 may also determine whether the extracted feature amount is a feature extracted from a real living body or a fake living body, for example, a picture or a print, with the use of a machine learning technique, for example, random forest or support vector machine (SVM).

Next, the authentication processing unit 2 temporarily saves the extracted feature amount as a registration candidate (Step S112). Subsequently, the authentication processing unit 2 compares the number of stored registration candidates with a preset number (Step S113). When the number of stored registration candidates is smaller than the preset number, the number of stored registration candidates is insufficient, and then the processing proceeds to the setting of camera control parameters (Step S100). When the number of stored registration candidates satisfies the preset number, the number of stored registration candidates is sufficient, and then the authentication processing unit 2 calculates a similarity between the feature amounts being registration candidates (Step S114).

Next, the authentication processing unit 2 compares the calculated similarity with a preset threshold value (Step S115). When the calculated similarity is lower than the preset threshold value, the authentication processing unit 2 determines that the registration of the registration candidate is to be denied, and deletes corresponding registration candidate data stored in the memory 7. Then, the processing proceeds to the setting of camera control parameters (Step S100). When the calculated similarity is higher than the threshold value, the authentication processing unit 2 determines that the registration candidate is allowed to be registered (Step S116), and stores corresponding registration candidate data in the memory 7. Through the above-mentioned processing, the registration of the biometric information is completed.

Figure 4:
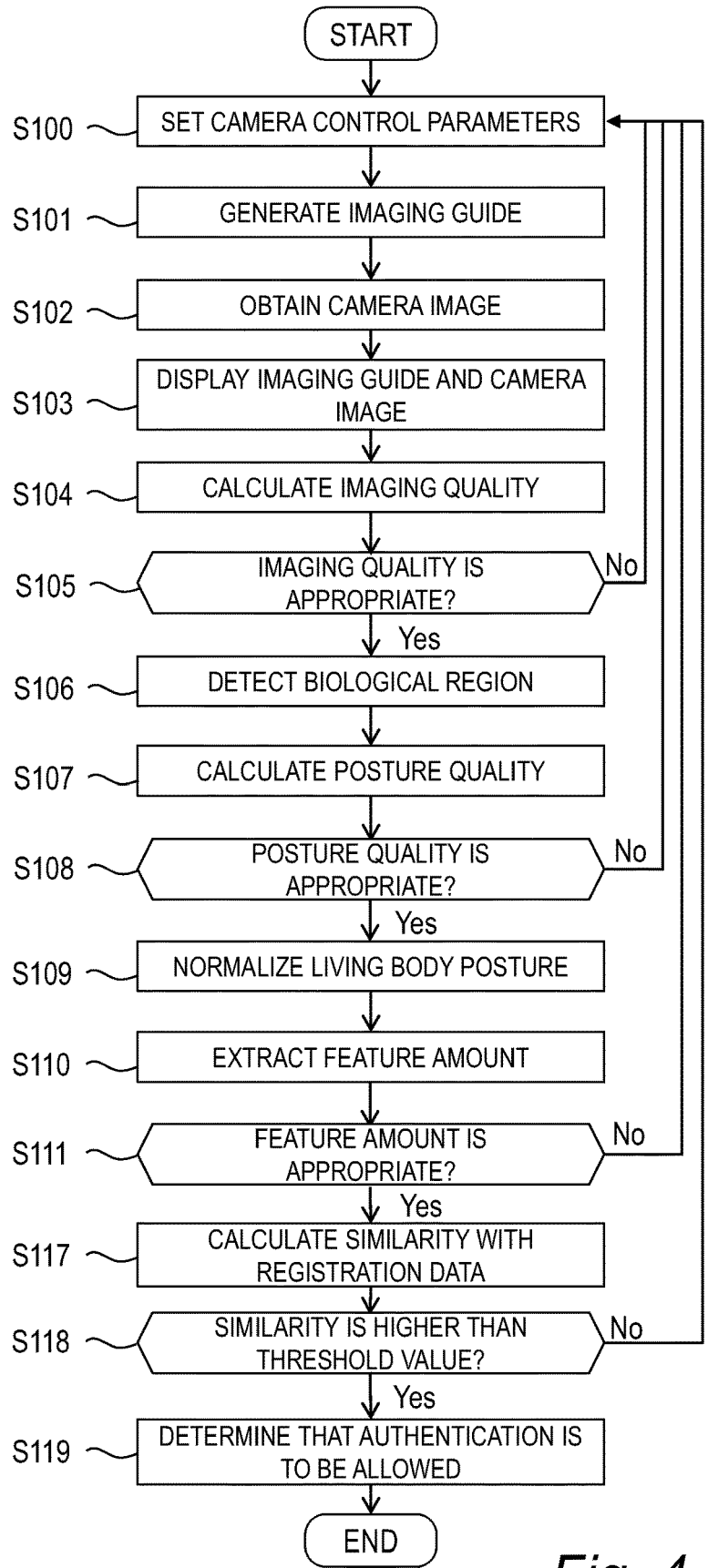
FIG. 4 is a flowchart for illustrating processing executed at the time of authentication by the biometric authentication system of the first embodiment.

FIG. 4 is a flowchart for illustrating processing executed at the time of authentication by the biometric authentication system of the first embodiment.

In a processing flow of FIG. 4, the setting of camera control parameters (Step S100), the generation of an imaging guide (Step S101), the obtaining of a camera image (Step S102), the display of an imaging guide and a camera image (Step S103), the calculation of an imaging quality (Step S104), the appropriateness determination as to an imaging quality (Step S105), the detection of a biological region (Step S106), the calculation of a posture quality (Step S107), the appropriateness determination as to a posture quality (Step S108), the normalization of a living body posture (Step S109), the extraction of a feature amount (Step S110), and the appropriateness determination as to a feature amount (Step S111) are the same as the processing flow for registration.

After the appropriateness determination as to a feature amount (Step S111), the authentication processing unit 2 calculates a similarity between the feature amount extracted in Step S110 and previously registered biometric feature amount data (Step S117). Subsequently, the authentication processing unit 2 compares the calculated similarity with a preset threshold value (Step S118). When the calculated similarity is higher than the preset threshold value, the authentication processing unit 2 determines that the authentication is to be allowed (Step S119), and then ends the authentication processing. When the calculated similarity is not higher than the threshold value, the authentication processing unit 2 determines that the authentication is to be denied, and the processing proceeds to the setting of camera control parameters (Step S100).

At the time of displaying the guide image and the message or the like (Step S103) of the registration and authentication processing, an imaging guide, for example, images that resemble the shapes of the face and the hand, respectively, and a message that prompts the person to be authenticated to present the face and the hand as illustrated in FIG. 2, and the captured camera image are displayed on the display at the same time. In a case of using a landscape display, when the guide images of the face and the hand are displayed side by side, it is possible to instruct the person to be authenticated to present the face and the hand side by side without difficulty. As a result, the face and the hand can be imaged without being blocked by each other with respect to the camera images, and images of the face and the hand can be obtained by the single camera.

Figure 5A:
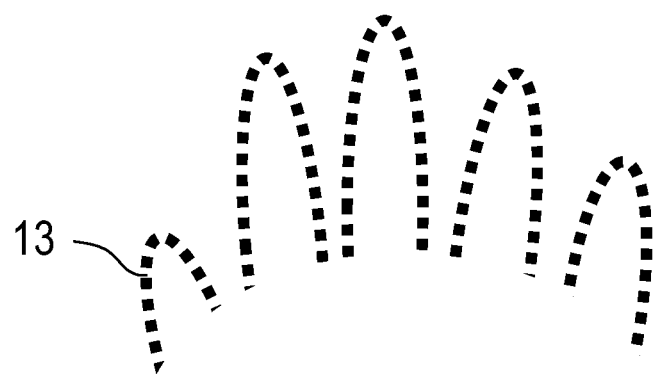
FIG. 5A and FIG. 5B are diagrams for illustrating an example of a guide image displayed by the biometric authentication system of the first embodiment.
Figure 5B:
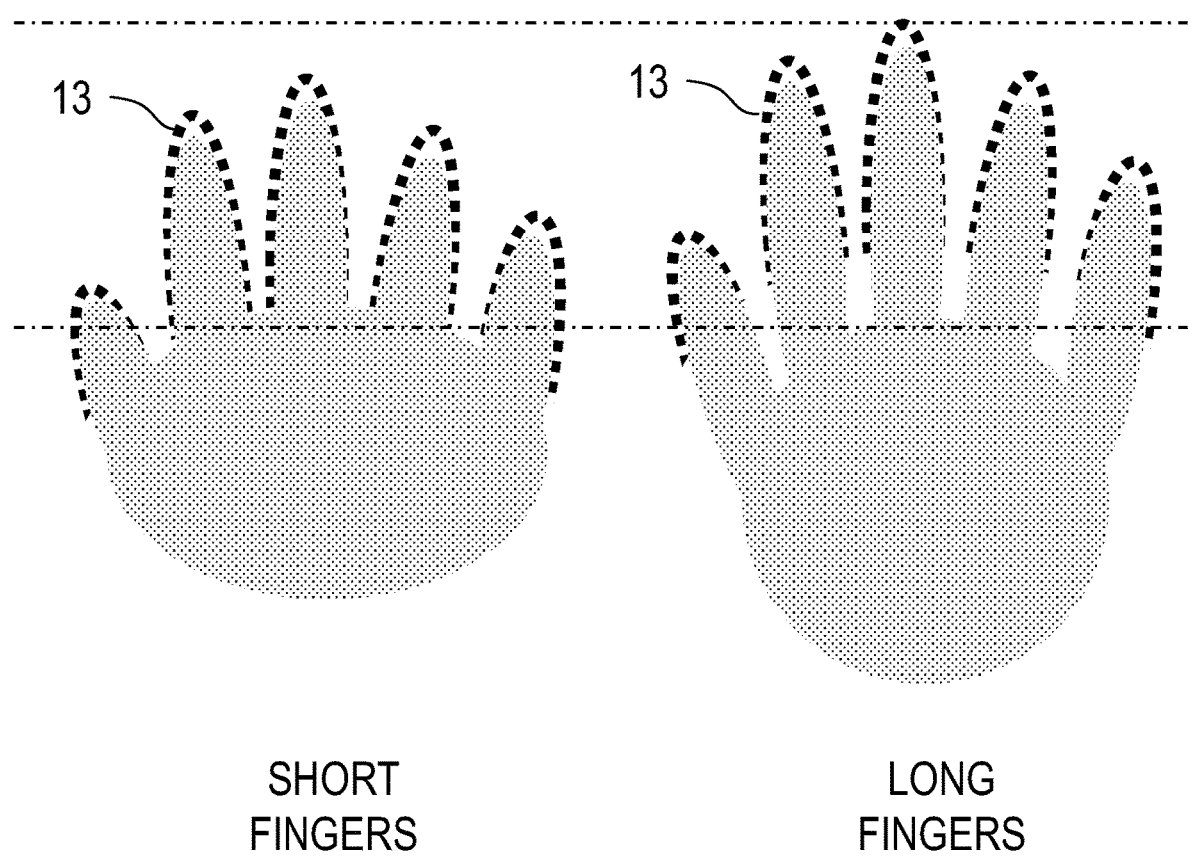

FIG. 5A and FIG. 5B are diagrams for illustrating an example of a guide image displayed by the biometric authentication system of the first embodiment.

For example, in a case of detecting regions of one or more fingers for use in authentication from the presented hand, a guide image 13 having an outline shape of the open hand as illustrated in FIG. 5A is displayed, and the hand presented in accordance with the guide image 13 is imaged. With this operation, it is possible to prevent distortion of biological tissues such as the fingerprint, veins, and surface wrinkles of the finger caused by the contact between adjacent fingers, and thus to reduce an error in the normalization of the living body posture (Step S109) and the extraction of the feature amount (Step S110), for example.

Further, as illustrated in FIG. 5B, when the guide image 13 not including the outline of the base of the finger out of the outline of the hand is displayed, even a person to be authenticated having shorter or longer fingers than those of the hand of the guide image 13 can more easily fit his or her own hand to the guide image 13, leading to higher usability.

Regarding the detection of a biological region (Step S106) of the registration and authentication processing, assuming that the display 4 is a light source, the camera 1 can be said to image reflected light that is radiated from the light source and then reflected by the surface of the living body, for example, the face 11 and the hand 12. Here, in general, the display 4 has a larger distance from a wall of a room being the background than a distance from the face 11 and hand 12 being the foreground. Considering the fact that light intensity attenuates in proportion to the square of the distance, a possible amount of light that is radiated from the display 4 serving as the light source, reflected by the background, and then taken by the camera 1 is much smaller than a possible amount of light that is reflected by the foreground and taken by the camera 1. Accordingly, in an image captured by the camera 1 with the luminance or color of a video image to be displayed on the display 4 being varied, the luminance or color changes only in the biological region being the foreground but does not significantly change in another region being the background. Such a difference can be used to extract the biological region.

Figure 6:
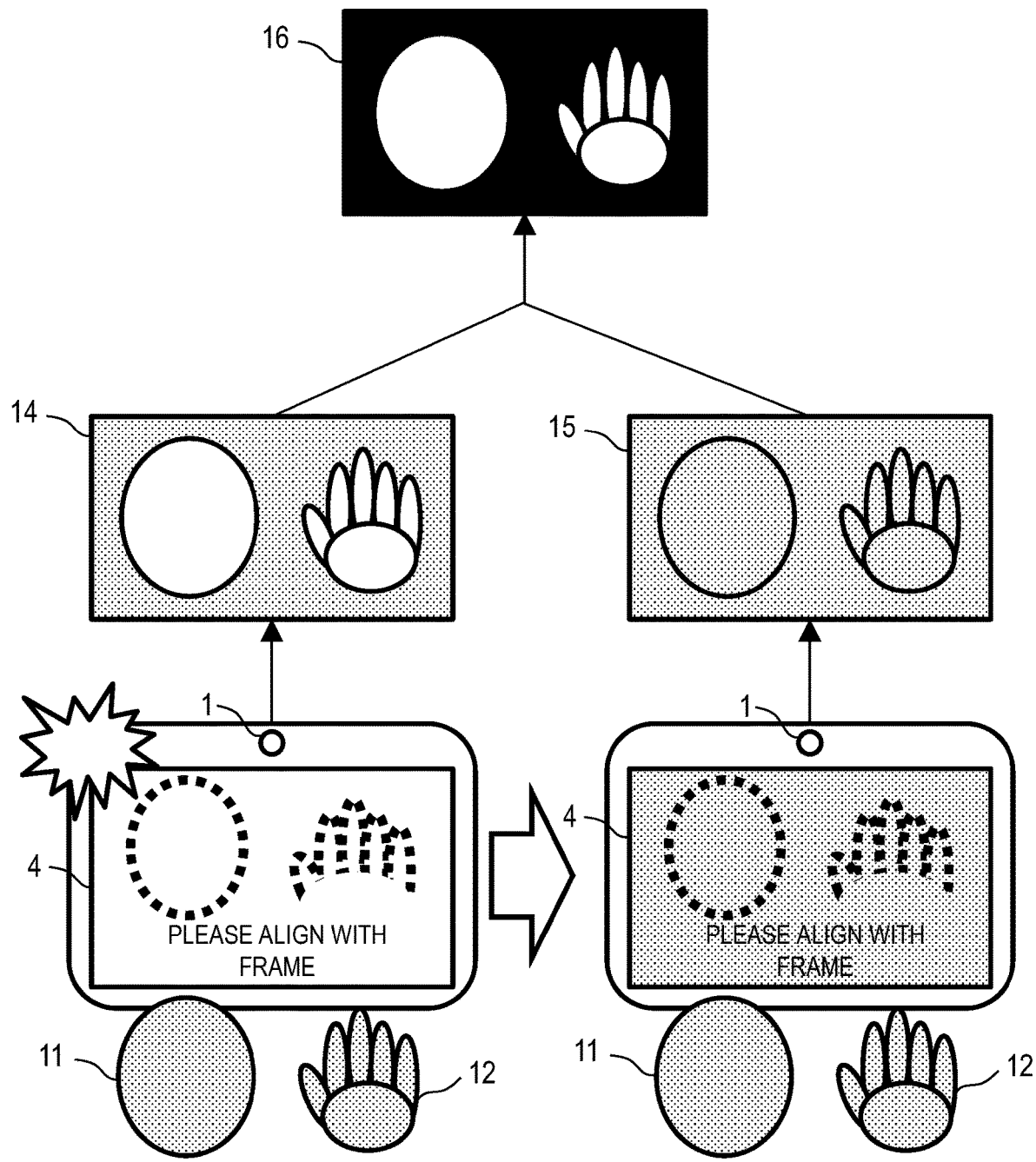
FIG. 6 is a diagram for illustrating how to execute processing for detecting a biological region by the biometric authentication system of the first embodiment with a display being used as a light source.
Figure 7:
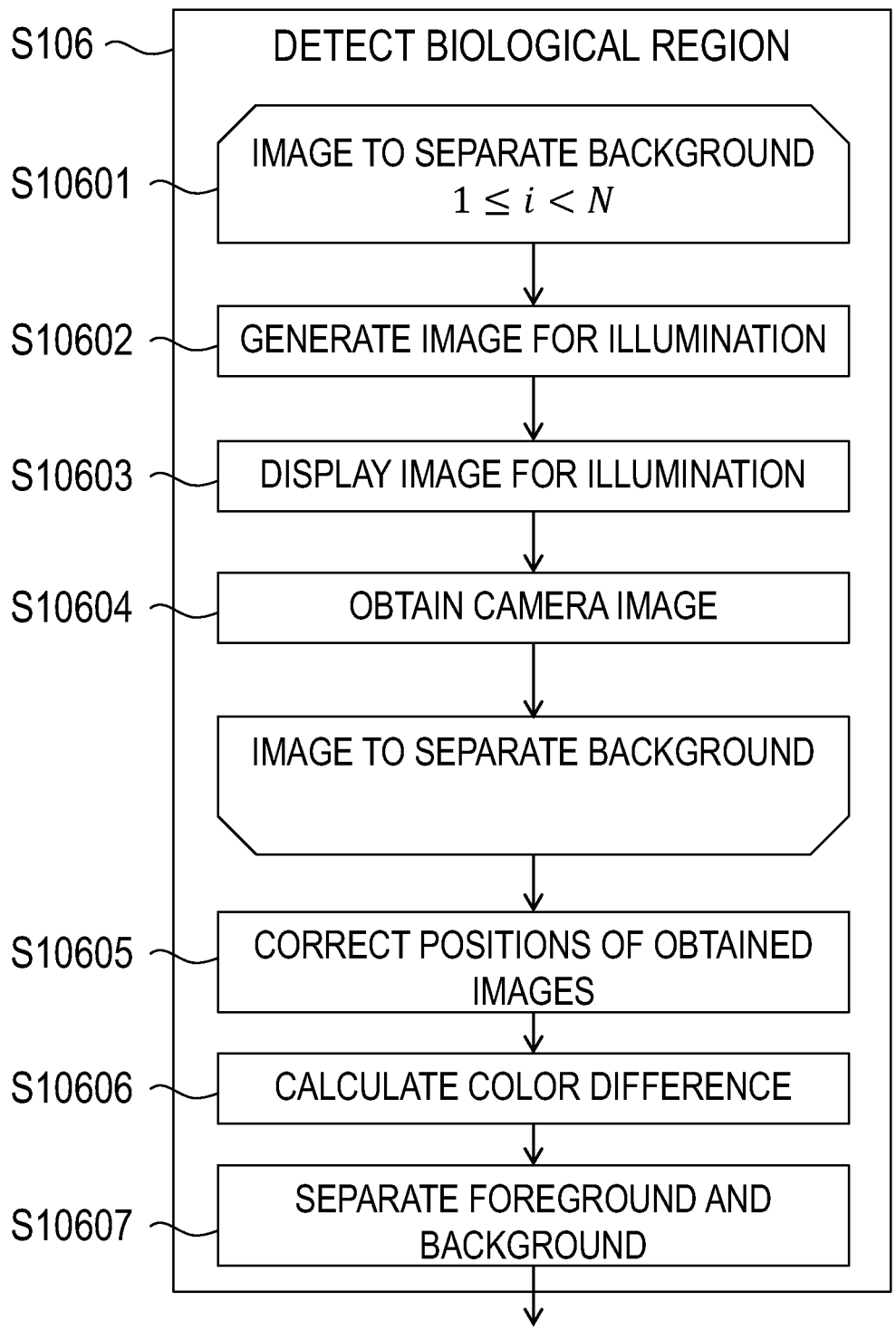
FIG. 7 is a flowchart for illustrating how to execute processing for detecting a biological region by the biometric authentication system of the first embodiment with the display being used as a light source.

FIG. 6 is a diagram for illustrating how to execute processing for detecting a biological region (Step S106) by the biometric authentication system of the first embodiment with the display 4 being used as a light source. FIG. 7 is a flowchart for illustrating the processing.

In this processing, N imaging operations are carried out so as to separate from the camera image the background being the region other than the biological region (Step S10601). Then, positions of obtained images are corrected so as to absorb camera shakes and movement of a subject (Step S10605). Then, a color difference between pixels of the obtained images subjected to the position correction is calculated (Step S10606).

At the time of N imaging operations (Step S10601), the system generates an image to be displayed as illumination on the display 4 (Step S10602) and displays the generated image (Step S10603), and then obtains a camera image (Step S10604). Here, assuming that N=2, for example, the system may display the image serving as the illumination with the use of the display 4, for example, and under this state, capture an image of a subject with the use of a color camera 1 provided on the same surface as the display 4. Then, the system may separate the image of the subject into the foreground and the background with reference to the obtained two images.

The color camera 1 includes, for example, three types of light receiving elements having sensitivities to blue (B), green (G), and red (R), respectively. Those elements are arrayed in matrix in each pixel. The light receiving elements have spectral sensitivities that have peaks at around 480 nanometers for blue, around 550 nanometers for green, and around 620 nanometers for red. Through the imaging operation with the color camera, spatial luminance distribution of light having sensitivity peaks at three different wavelengths can be obtained.

Further, the display 4 includes, for example, a backlight serving as a light source, a deflection filter configured to control the luminance, and a color filter configured to control the color. The color filter includes three types of filters that transmit blue (B) light, green (G) light, and red (R) light, respectively. Those filters are arrayed in matrix in each pixel. The luminance is assumed to be controllable in 256 levels of from 0 to 255.

In order to precisely separate the foreground and the background (Step S10607), it is required to generate an image for illumination (Step S10602) so as to maximize the color difference between the foreground and the background in calculation of the color difference (Step S10606). For simple description, it is presumed that the product of the sensitivities of the light receiving elements for blue (B) and red (R) of the color camera is substantially 0 (specifically, one element has no sensitivity to a wavelength to which another element has a sensitivity), and a wavelength to which the RGB light receiving elements of the color camera have zero spectral sensitivity substantially matches a wavelength to which the RGB color filters of the display have zero transmittance. BGR channels of an image 14 obtained through a first imaging operation are expressed by (B, G, R)=(gB1, gG1, gR1), and BGR channels of an image 15 obtained through a second imaging operation are expressed by (B, G, R)=(gB2, gG2, gR2). A color difference image 16 is expressed by a numerical expression:

$$e=(gB1-gB2)+(gR2-gR1).$$

Pixels of the color difference image 16 have a difference of substantially 0 at the pixels of the background not close to the display, but are varied depending on the luminance or color of the image displayed as the illumination on the display at the pixels of the foreground, for example, the biological region close to the display. In this case, when an image of (B, G, R)=(255, 0, 0) is displayed on the display in the first imaging operation, and an image of (B, G, R)=(0, 0, 255) is displayed on the display in the second imaging operation, the luminance in the foreground of the color difference image 16 is maximized (first and second imaging operations can be executed in any order).

In this example, the authentication processing unit 2 controls the display (specifically, display unit 4) to change the luminance in blue (B) and red (R), to thereby change intensities in blue (B) and red (R) of light radiated to the living body. However, this is just an example, and it is only required to control the light source so as to change an intensity in at least one color. As another example, a light source other than the display may be used.

The above-mentioned case is an example of a calculation method that enables maximization of a luminance difference between the foreground and the background in the color difference image 16 in the foreground and background separation operation with the image on the display being used as the illumination. When constraints on the light receiving elements of the color camera 1 and the color filters of the display 4 are not satisfied and also, a different calculation method for the color difference image 16 is to be applied, it is only required to adopt an image on the display and a calculation method for the color difference image that enable maximization of the luminance difference between the foreground and the background, in accordance with such conditions.

At the time of extracting a feature amount (Step S110), the authentication processing unit 2 may extract a pattern of the vein, epidermis, or dermis of the finger or an end point or branch point of the fingerprint ridge as the feature amount, for example. End points of the eyebrow and the eye of the face and the outline of a portion around the nose and the mouth may be also extracted as the feature amount, for example. As another example, the CNN or other machine learning technique may be utilized to automatically design and extract a feature amount from the captured image.

As an example, it is assumed that the feature amount is extracted from the finger of the biological region with the use of the CNN. The fingerprint of the finger skin and the vein of the finger, for example, are generally known to be uncommon to everyone. Even blood-related persons have different patterns. In general, the number of variations of the finger existent in the real world is by far larger than a possible number of variations actually prepared for training the CNN to extract a feature amount from the finger image. As a result, overfitting is liable to occur in a general CNN that executes fully connecting processing through alternately repeated convolution processing and pooling processing to connect all pixels in an image throughout layers to an output layer.

As one way to avoid the overfitting, there is a method using a fully convolutional network (FCN) being an example of the CNN, which does not adopt the fully connecting processing. Regarding the FCN, image structure of the input image is held up to the output image, and its learning with a small amount of data causes less overfitting. As a method of authenticating the person to be authenticated robustly against the change in position and posture with the use of a feature amount extracted by the FCN, there is known a method of gradually reducing the resolution of FCN layers with each layer to extract a low-frequency feature amount.

However, the above-mentioned method is not adaptable to extraction of a high-frequency feature amount that can be otherwise used for individual recognition. As a method of simultaneously extracting a low-frequency feature amount and a high-frequency feature amount, there is known a method of gradually reducing the resolution of the FCN layers with each layer and then connecting the layers in a later stage. In this case, a method of calculating a similarity with registration data is required, which is less influenced by positional deviation while using the high-frequency feature amount.

Figure 8:
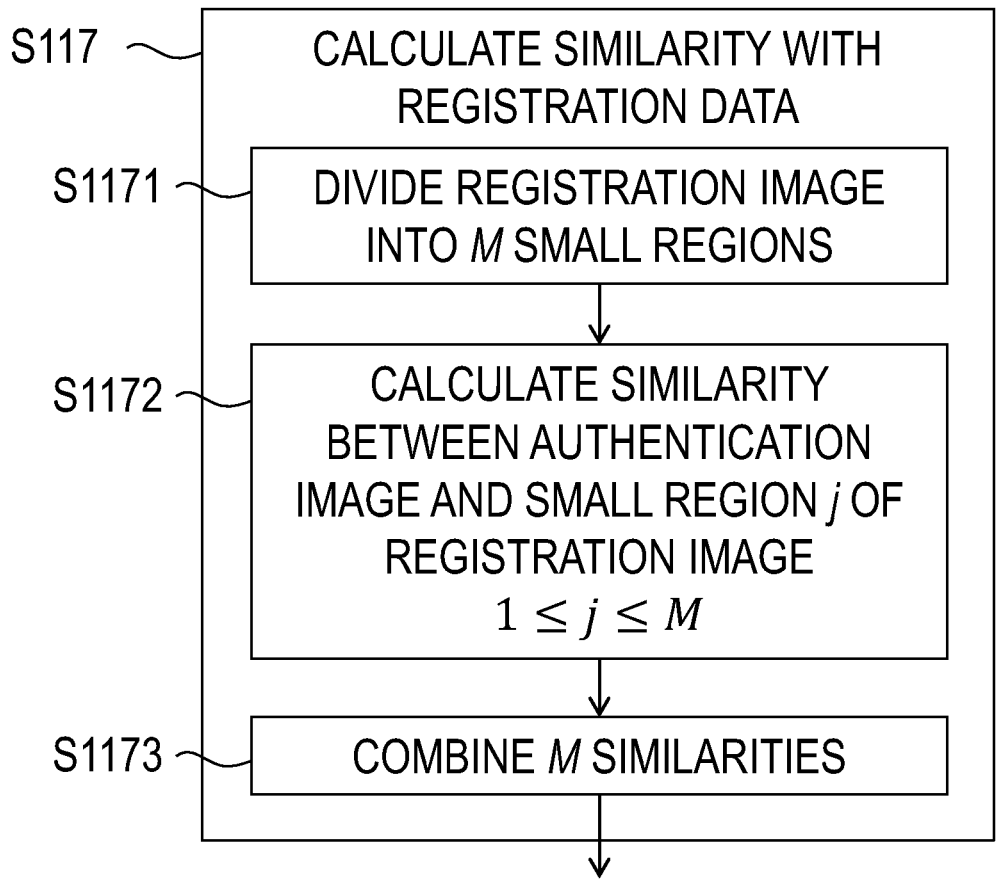
FIG. 8 is a flowchart for illustrating a detailed example of processing for calculating a similarity with a registration data by the biometric authentication system of the first embodiment.

FIG. 8 is a flowchart for illustrating a detailed example of processing for calculating a similarity with the registration data (Step S117) by the biometric authentication system of the first embodiment.

Specifically, FIG. 8 is an illustration of a flow of processing for suppressing an influence of positional deviation while using a high-frequency feature amount in the calculation of a similarity with the registration data (Step S117). First, the authentication processing unit 2 divides a registration image into M small regions (Step S1171). In a case of using a feature amount extracted from an image of the finger, the image may be divided into three regions across the first joint and the second joint, for example.

Next, the authentication processing unit 2 calculates a similarity between an authentication image and each small region of the registration image (Step S1172). As a measure of the similarity, the Manhattan distance and the Euclidean distance can be used, for example. At the time of calculating a similarity, the authentication processing unit 2 calculates the similarity with each small region of the registration image while scanning a certain region on the authentication image, and then adopts the highest similarity in the scanned region.

Next, the authentication processing unit 2 combines the M calculated similarities to obtain a final similarity (Step S1173). As a combining method, there may be adopted a method using an average value of the M similarities, for example. As described above, through adopting of the similarity at a position at which the highest similarity is achieved in each small region of the registration image, it is possible to suppress an influence of the positional deviation even between feature amounts including high-frequency components.

Further, the following case is considered in relation to the calculation of a similarity with the registration data (Step S117): the registration data and the authentication are derived from a different person (matching with another person). In this case, it is preferred that the calculated similarity be low. In a case of the registration data being a plurality of images having a low pattern correlation, for example, overlapping biological tissues, similarity in one feature at a position at which the highest similarity is achieved in another feature amount is used for authentication, to thereby avoid such a situation that the highest similarity with the registration data obtained through matching with another person is used for authentication.

This is because when the registration data and the registration data are derived from the same person, the highest similarity is achieved at almost the same position in the above-mentioned two feature amounts, but when those pieces of data are derived from a different person, the highest similarity is often achieved at different positions in the above-mentioned two feature amounts. The above-mentioned processing is summarized in a flow of FIG. 9.

Figure 9:
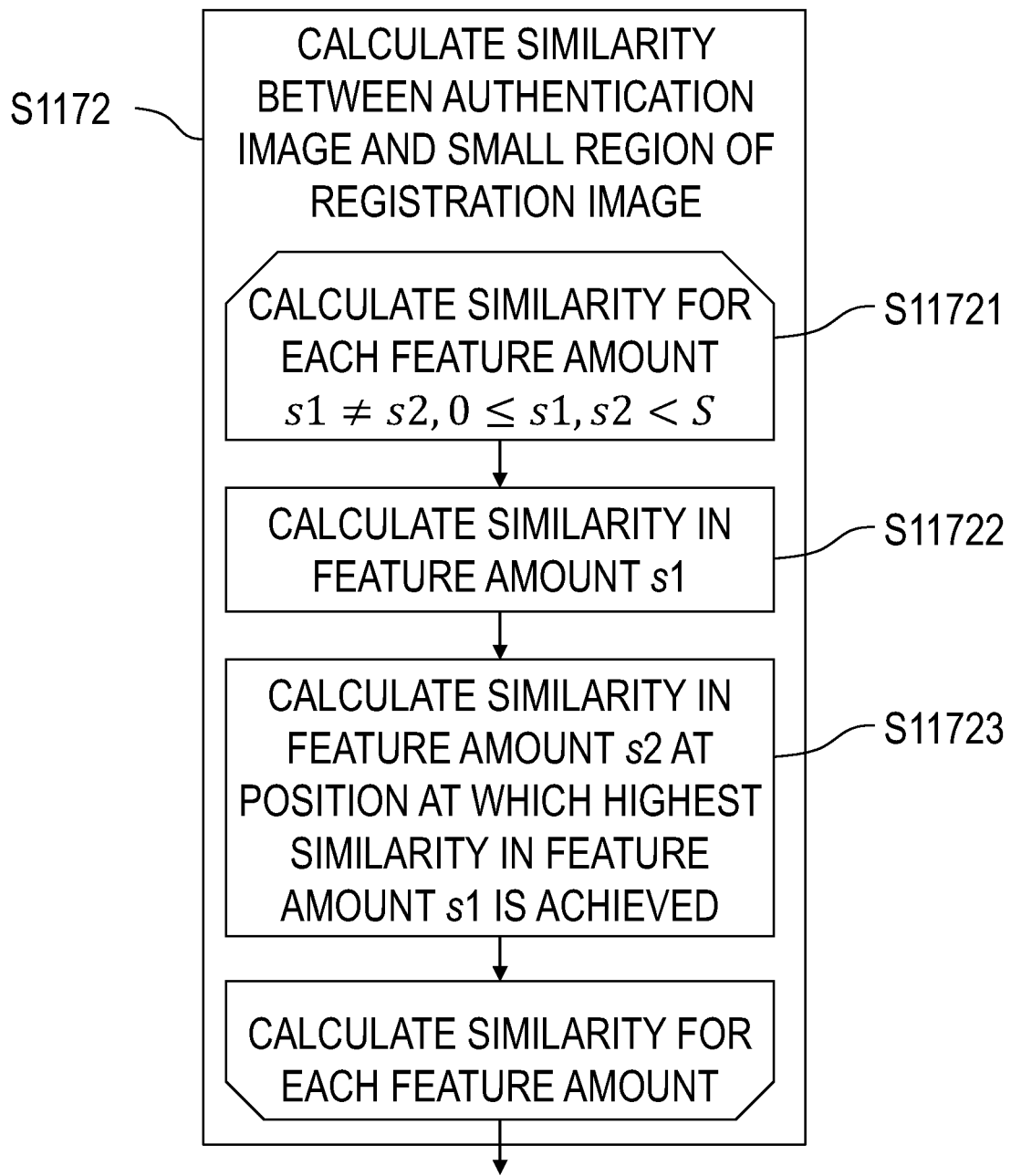
FIG. 9 is a flowchart for illustrating a detailed example of processing for calculating a similarity by the biometric authentication system of the first embodiment.

FIG. 9 is a flowchart for illustrating a detailed example of processing for calculating a similarity by the biometric authentication system of the first embodiment.

At the time of calculating a similarity between the authentication image and each small region of the registration image (Step S1172), the authentication processing unit 2 first calculates the similarity for each feature amount (Step S11721). For example, first, the similarity with the registration image is calculated for a feature amount s1 (Step S11722). Next, at a position at which the highest similarity is achieved in the feature amount s1, a similarity is calculated for a feature amount s2 (Step S11723). The similarities for each feature amount are calculated in this way. In this case, the feature amount s1 and the feature amount s2 are different feature amounts included in S feature amounts extracted in processing to be described later with reference to FIG. 10, for example. This method is applicable to, for example, the epidermis, dermis, or vein patten of the finger.

However, the above-mentioned pattern may not be stably extracted with ease as a feature amount due to the change in illumination during imaging or the constraints on the apparatus, for example. For example, in a case of radiating near-infrared light to the finger and imaging transmitted light thereof, a vein pattern is sharp in the obtained image of the transmitted light, but the texture of the skin surface, specifically, the epidermis and dermis patterns, are considerably blurry. Further, in a case of radiating visible light to the finger and imaging reflected light thereof, the epidermis and dermis pattens are sharp in the obtained image of the reflected light but the vein pattern is considerably blurry. Accordingly, even when patterns of a plurality of overlapping biological tissues are hard to extract at the same time, it is required to extract a plurality of patterns having a low correlation.

Figure 10:
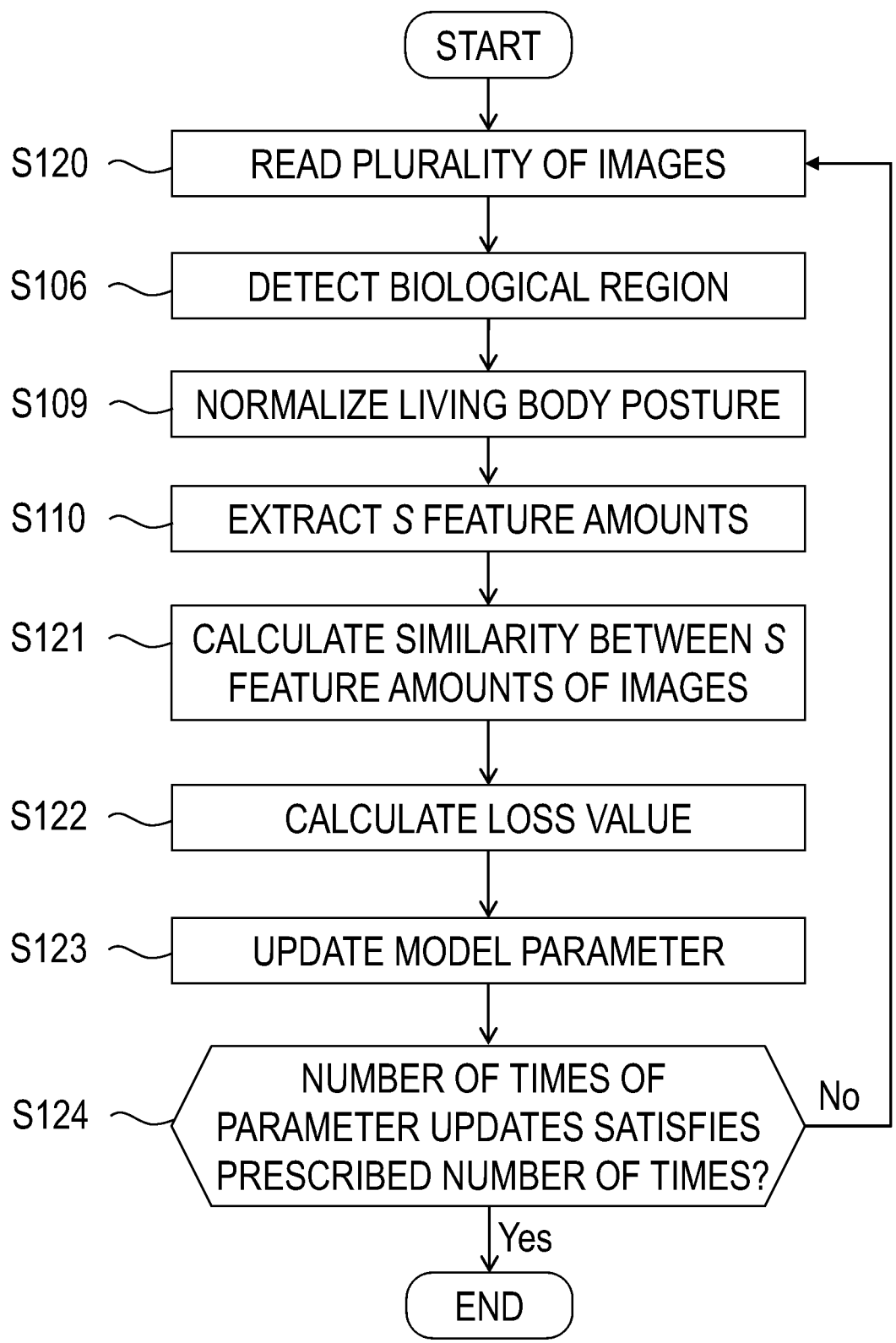
FIG. 10 is a flowchart for illustrating processing for extracting a plurality of feature amounts having a low correlation by the biometric authentication system of the first embodiment.
Figure 11:
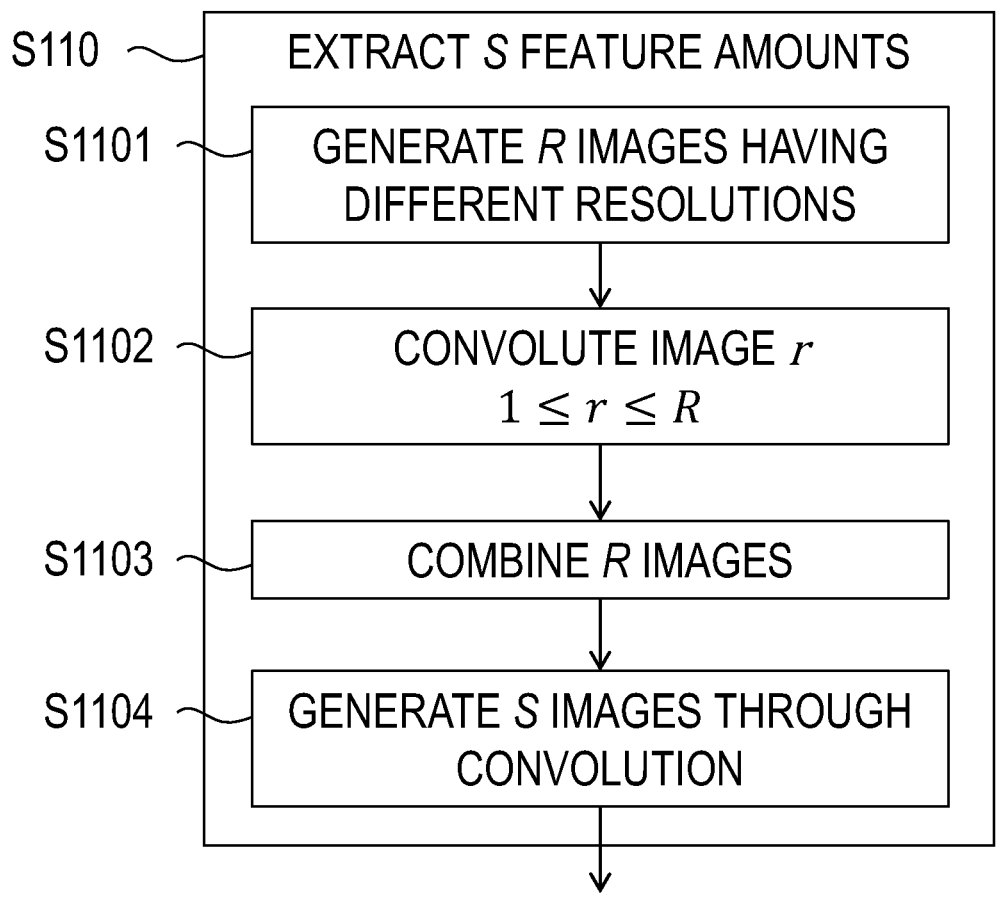
FIG. 11 is a flowchart for illustrating processing for extracting a plurality of feature amounts having a low correlation by the biometric authentication system of the first embodiment.

FIG. 10 and FIG. 11 are flowcharts for illustrating processing for extracting a plurality of feature amounts having a low correlation by the biometric authentication system of the first embodiment.

Specifically, FIG. 10 and FIG. 11 are each an illustration of the processing for extracting a plurality of feature amounts having a low correlation so as to suppress the influence of positional deviation and also to reduce the similarity in matching with another person, in the calculation of a similarity with the registration data (Step S117). This processing is divided into processing illustrated in FIG. 10 and processing illustrated in FIG. 11. In the processing of FIG. 10, a machine learning model is optimized so that a feature amount extraction model (hereinafter referred to as "machine learning model") generated by the CNN or other machine learning generates a plurality of feature amounts having a low correlation from the input image. In the processing of FIG. 11, a feature amount is extracted with the use of the machine learning model at the time of registration and authentication.

In the processing for optimizing the machine learning model as illustrated in FIG. 10, the authentication processing unit 2 first reads a plurality of images for the optimization processing (Step S120), and then executes the detection of a biological region (Step S106), the normalization of a living body posture (Step S109), the extraction of S feature amounts (Step S110), calculation of a similarity in feature amount among the read S images (Step S121), calculation of a loss value of the machine learning model based on the calculated similarity (Step S122), and updating of parameters of the machine learning model based on the loss value (Step S123). Finally, the authentication processing unit 2 determines whether the number of times of parameter updates satisfies a prescribed number of times (Step S124). The authentication processing unit 2 ends the processing when the prescribed number of times is satisfied, or proceeds to the reading of an image (Step S120) when the prescribed number of times is not satisfied.

In the above-mentioned processing, the detection of a biological region (Step S106) and the normalization of a living body posture (Step S109) are the same as those in the registration processing flow of FIG. 3 and the authentication processing flow of FIG. 4. An image to be read in the reading of an image (Step S120) is basically an image obtained by imaging the living body, but may be an image of a biological region obtained by executing the detection of a biological region (Step S106) and the normalization of a living body posture (Step S109) on the captured image. In this case, after the reading of an image (Step S120), the extraction of a feature amount (Step S110) may be executed directly by the machine learning model.

The extraction of a feature amount (Step S110) is executed as illustrated in a processing flow of FIG. 11 to be described below. The calculation of a similarity in feature amount between images (Step S121) is the same as that in the processing flow of FIG. 8 and FIG. 9. At the time of calculating a loss value (Step S122), when the CNN is used as the machine learning model, a loss value, for example, contrastive loss or triplet loss, may be calculated based on the above-mentioned similarity, for example. At the time of updating a model parameter (Step S123), when the CNN is used as the machine learning model, an error back-propagation method may be applied to update kernel values in each layer of the CNN based on the above-mentioned loss value.

In Step S122, a loss value may be also calculated so that the loss value increases as the similarity of a biological feature of a different person increases, and also so that the loss value decreases as the similarity of a biological feature of the same person increases. Then, in Step S123, a model parameter is updated to decrease the loss value. As a result, the feature amount extraction model for extracting, from one biological image, a plurality of biological feature amounts having a low pattern correlation is learned.

In the extraction of S feature amounts (Step S110) as illustrated in FIG. 11, it is assumed that the CNN is used as the machine learning model. The authentication processing unit 2 first generates R images having different resolutions from an input image (Step S1101), and then executes convolution processing on the generated images (Step S1102) and combines the thus-processed R images (Step S1103). Finally, the authentication processing unit 2 executes convolution processing on the combined image (Step S1104), to generate an image having S feature amounts.

At the time of generating images having different resolutions (Step S1101), the authentication processing unit 2 may, for example, reduce or enlarge the input image, or generate a low-resolution image from the input image through convolution processing. At the time of convoluting the R images (Step S1102), the authentication processing unit 2 may execute the convolution processing not once but a plurality of times, and also may execute processing for normalizing the luminance of the image after each convolution processing. At the time of combining the R images (Step S1103), the authentication processing unit 2 combines image data thereof in a channel direction to generate image data.

At the time of final convolution (Step S1104), the authentication processing unit 2 executes convolution processing so as to reduce the number of channels of the combined image data to S channels. Through the above-mentioned processing, S feature amounts represented in the form of density image can be obtained.

It should be noted that the processing of FIG. 10 and FIG. 11 may be executed by the registration module 10 or the authentication module 9 of the authentication processing unit 2, or alternatively executed by another function (not shown) (for example, model optimization module). In this case, the processing of the model optimization module is executed by the CPU 6 in accordance with the program stored in the memory 7 as with the processing of the registration module 10 and the authentication module 9. The processing of the model optimization module is executed before the registration processing of FIG. 3 and the authentication processing of FIG. 4.

Figure 12:
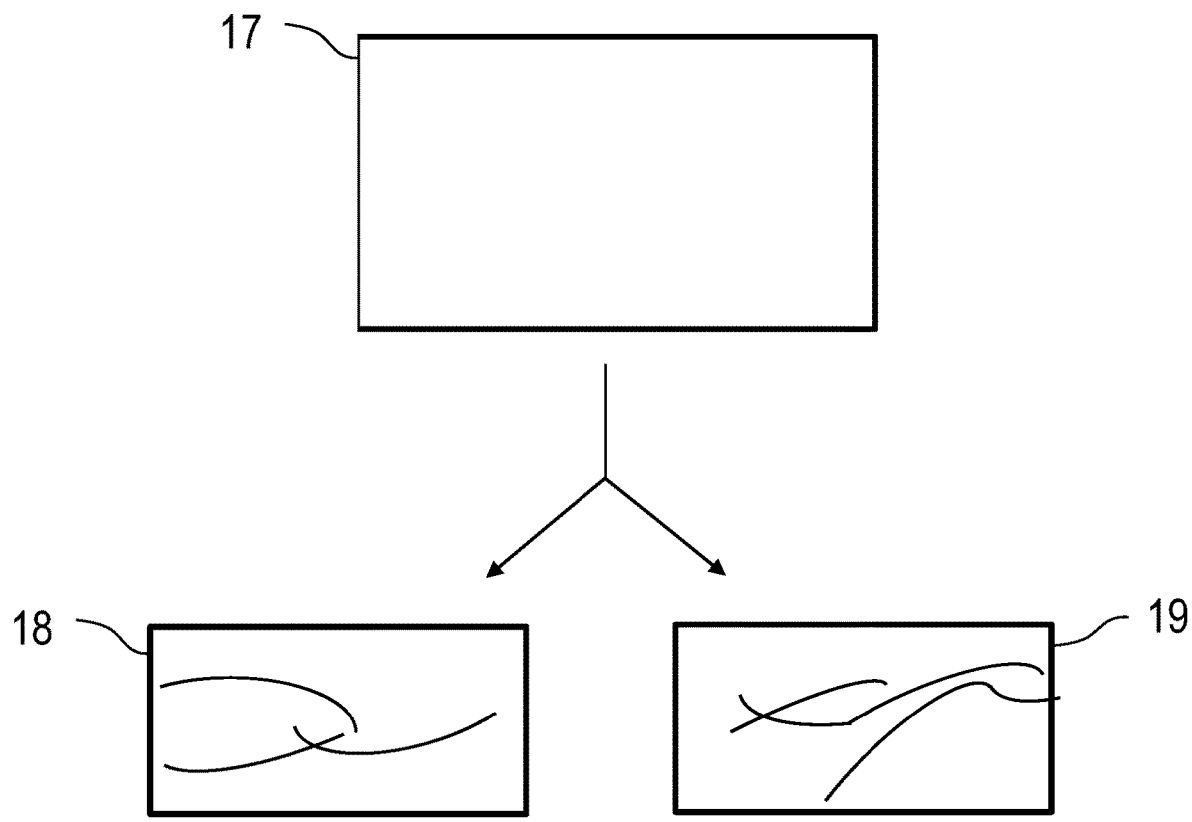
FIG. 12 is a diagram for illustrating an example of processing for extracting a feature amount by the biometric authentication system of the first embodiment.

FIG. 12 is a diagram for illustrating an example of processing for extracting a feature amount by the biometric authentication system of the first embodiment.

Specifically, FIG. 12 is an illustration of a processing example of the above-mentioned optimization of a machine learning model (Step S120) and the extraction of a feature amount (Step S110) based on the optimized model under the condition of S=2. A feature extraction image 18 and a feature extraction image 19 are obtained with respect to an input finger image 17, and those S (two in the example of FIG. 12) feature amounts have a low pattern correlation.

This is because, as a result of optimization aimed at reducing the similarity between feature amounts of the registration data and the authentication data which are derived from a different person, that is, the similarity obtained through matching with another person, the feature amounts have a lower pattern correlation, and an image position at which the highest similarity is achieved in one feature is different from an image position at which the highest similarity is achieved in another feature.

Meanwhile, when the registration data and the authentication data are derived from the same person, that is, at the time of matching with the same person, even when feature amounts thereof have a low pattern correlation, those feature amounts are obtained from the same input image, and hence the matching positions at which the highest similarities with the registration data are achieved in the respective feature amounts are substantially the same.

As described above, the biometric authentication system according to at least one aspect of this invention, which is illustrated in FIG. 1A and FIG. 1B, for example, includes an image input unit (for example, image input unit 1) configured to obtain an image by imaging a living body, a storage unit (for example, storage unit 3) configured to store registration information relating to a plurality of biological features obtained from a biological region of an image of each person, and an authentication processing unit (for example, authentication processing unit 2) configured to process a biological region of the image obtained by the image input unit to execute biometric authentication based on the registration information. In this case, the plurality of biological features obtained from the biological region of the each person are a plurality of biological features having a low pattern correlation with one another. The authentication processing unit is configured to combine the plurality of biological features having a low pattern correlation with one another, which are obtained by processing the image, to execute the biometric authentication.

The above-mentioned plurality of biological features having a low pattern correlation with one another may be biological features of the face and the finger obtained by the method illustrated in FIG. 2, for example, or S feature amounts obtained by the method illustrated in FIG. 10 and FIG. 11.

With this configuration, the plurality of biological features having a low correlation with one another can be extracted from images captured at a time. Through matching with the plurality of biological features, stable and highly accurate authentication is ensured.

Here, the living body to be imaged by the image input unit may include the finger.

With this configuration, the biometric authentication is improved in usability.

Further, the plurality of biological features may include a first biological feature and a second biological feature, and the authentication processing unit may be configured to calculate, based on a similarity between a first biological feature obtained from a biological region of the image captured by the image input unit and a first biological feature of the registration information, a similarity between a second biological feature obtained from the biological region of the image captured by the image input unit and the first biological feature of the registration information.

For example, the image captured by the camera may be aligned with the image of the registration information so as to maximize the similarity in a feature amount s 1 being one of the S feature amounts obtained by the method illustrated in FIG. 10 and FIG. 11, for example, and then, matching with a feature amount s2 different from the feature amount s1 may be performed at that position. As illustrated in FIG. 10 and FIG. 11, the feature amounts s1 and s2 have a low correlation, and hence, in a case of authenticating another person, the similarity of the feature amount s2 is expected to be sufficiently low. As a result, the authentication accuracy is improved.

Further, the image input unit may be configured to image the same living body a plurality of times, and the authentication processing unit may be configured to: control light to be radiated to the living body so as to change an intensity of at least one color out of colors of the light to be radiated to the living body at a time of imaging the living body the plurality of times; and extract the biological region from the image based on a degree of a change in intensity of the at least one color in a plurality of images obtained through imaging of the living body the plurality of times. This processing can be executed by the method illustrated in FIG. 7, for example.

With this configuration, when the image captured by the image input unit includes a biological region and another region, the biological region can be easily extracted.

Moreover, the biometric authentication system may further include a display unit (for example, display unit 4) configured to display an image captured by the image input unit and a guide indicating a desired position of the living body. In this case, the authentication processing unit may be configured to change an intensity of at least one color output from the display unit so as to control the light to be radiated to the living body. This processing can be executed by the method illustrated in FIG. 5A and FIG. 5B, for example.

With this configuration, the posture of the living body to be imaged, for example, can be adjusted, to thereby improve the user's convenience as well as reliably extract a biological feature. Further, with the screen itself being used as a light source, cost for installing the system can be reduced.

Further, the above-mentioned plurality of biological features may be extracted from the same portion of a biological region of each image. This processing can be executed by method illustrated in FIG. 10 and FIG. 11, for example.

With this configuration, a plurality of biological features can be extracted from the images captured at a time.

In this case, the authentication processing unit may be configured to: extract the plurality of biological features from images of a plurality of persons (for example, Step S110 of FIG. 10 and FIG. 11) with use of a feature amount extraction model; calculate a loss value of the feature amount extraction model based on a similarity among the plurality of biological features extracted from the images of the plurality of persons (for example, Step S122 of FIG. 10); and learn a parameter of the feature amount extraction model so as to reduce the loss value (for example, Step S123 of FIG. 10).

With this configuration, the plurality of biological features having a low correlation with one another can be extracted from images captured at a time.

Further, in this case, the authentication processing unit may be configured to: generate a plurality of images (for example, R images of FIG. 11) having different resolutions from a biological region of the image of the each person; generate a plurality of images through convolution of the plurality of images having different resolutions; and apply the feature amount extraction model to the plurality of images (for example, S images of FIG. 10 and FIG. 11) generated through the convolution, to thereby extract a plurality of biological features.

With this configuration, a plurality of biological features having a low correlation with one another can be extracted from the images captured at a time, thereby enabling stable and highly accurate authentication.

Further, the plurality of biological features may be extracted from different portions of a biological region of each image.

Specifically, the different portions of the biological region of each image may be a facial portion and a finger portion of a person included in each image as illustrated in FIG. 2 or FIG. 6, for example.

With this configuration, a plurality of biological features having a low correlation with each other can be extracted from the images captured at a time, thereby enabling stable and highly accurate authentication.

This invention is not limited to the at least one embodiment described above, and encompasses various modification examples. For example, the at least one embodiment has described this invention in detail for the ease of understanding, and this invention is not necessarily limited to a mode that includes all of the configurations described above.

Further, a part or all of the above-mentioned respective configurations, functions, processing units, processing means, and the like may be implemented by hardware through design using, for example, an integrated circuit. Further, the above-mentioned respective configurations, functions, and the like may be implemented by software by the processor interpreting and executing the programs for implementing the respective functions. The programs, the tables, the files, and other such information for implementing the respective functions may be stored in a storage device, for example, a non-volatile semiconductor memory, a hard disk drive, or a solid state drive (SSD), or a non-transitory computer-readable data storage medium, for example, an IC card, an SD card, or a DVD.

Further, the illustrated control lines and information lines are assumed to be required for the sake of description, and not all the control lines and information lines of a product are illustrated. It should be understood that almost all the configurations are coupled to one another in practical use.

What is claimed is:

1. A biometric authentication system, comprising:
    a camera configured to obtain an image by imaging a living body;
    a memory configured to store registration information relating to a plurality of biological features obtained from a biological region of an image of each person; and
    a processor communicatively coupled to the camera and the memory, wherein the processor is configured to execute biometric authentication of an individual by:
        dividing the biological region of the image obtained by the camera into a plurality of regions,
        calculating a first similarity for a first feature of the plurality of biological features of the image with an authentication image of a different individual stored in the memory,
        calculating a second similarity of a second feature of the plurality of biological features of the image at one of the plurality of regions that has a highest similarity with the first feature,
        combining the first similarity and the second similarity to obtain a final similarity,
        determine if the final similarity is greater than a threshold, on a condition that the final similarity is greater than the threshold, grant registration to the individual and save the registration information and any corresponding registration candidate data in the memory, and on a condition that the final similarity is less than the threshold, deny the registration to the individual and delete the registration information from the memory, and wherein a plurality of biological features obtained from the individual and a plurality of biological features obtained from the different individual have a lower pattern correlation than if the authentication image was obtained from the individual.

2. The biometric authentication system according to claim 1, wherein the living body to be imaged by the camera includes a finger.

3. The biometric authentication system according to claim 1,
wherein the camera is configured to image the living body a plurality of times, and
wherein the processor is further configured to:
control light to be radiated to the living body so as to change an intensity of at least one color out of colors of the light to be radiated to the living body at a time of imaging the living body the plurality of times; and
extract the biological region from the image based on a degree of a change in intensity of the at least one color in a plurality of images obtained through imaging of the living body the plurality of times.

4. The biometric authentication system according to claim 3, further comprising a display configured to display the image and a guide indicating a desired position of the living body,
wherein the processor is configured to change an intensity of at least one color output from the display so as to control the light to be radiated to the living body.

5. The biometric authentication system according to claim 1, wherein the plurality of biological features are extracted from a same region of the plurality of regions of each image.

6. The biometric authentication system according to claim 5, wherein the processor is further configured to:
extract the plurality of biological features from images of a plurality of persons with use of a feature amount extraction model;
calculate a loss value of the feature amount extraction model based on a similarity among the plurality of biological features extracted from the images of the plurality of persons; and
learn a parameter of the feature amount extraction model so as to reduce the loss value.

7. The biometric authentication system according to claim 6, wherein the processor is further configured to:
generate a plurality of images having different resolutions from a biological region of the image of the each person;
generate a plurality of images through convolution of the plurality of images having different resolutions; and
apply the feature amount extraction model to the plurality of images generated through the convolution, to thereby extract the plurality of biological features.

8. The biometric authentication system according to claim 1, wherein the plurality of biological features are extracted from different portions of a biological region of each image.

9. The biometric authentication system according to claim 8, wherein the different portions of the biological region of the each image are a facial portion and a finger portion of a person included in the each image.

10. A biometric authentication method, which is executed by a biometric authentication system comprising a camera, a memory, and a processor, the biometric authentication method comprising:
obtaining an image of a living body captured by the camera;
storing, by the processor, registration information relating to a plurality of biological features obtained from a biological region of an image of each person in the memory;
dividing, by the processor, the biological region of the image obtained by the camera into a plurality of regions to execute biometric authentication of an individual;
calculating, by the processor, a first similarity for a first feature of the plurality of biological features of the image with an authentication image of a different individual stored in the memory;
calculating, by the processor, a second similarity of a second feature of the plurality of biological features of the image at one of the plurality of regions that has a highest similarity with the first feature;
combining, by the processor, the first similarity and the second similarity to obtain a final similarity;
determine if the final similarity is greater than a threshold;
on a condition that the final similarity is greater than the threshold, grant registration to the individual and save the registration information and any corresponding registration candidate data in the memory; and
on a condition that the final similarity is less than the threshold, deny the registration to the individual and delete the registration information from the memory, and
wherein a plurality of biological features obtained from the individual and a plurality of biological features obtained from the different individual have a lower pattern correlation than if the authentication image was obtained from the individual.

11. A non-transitory computer-readable storage medium that stores a program that controls a biometric authentication system comprising a camera, a memory, and a processor, wherein the program is configured to cause the processor to execute:
obtaining an image of a living body captured by the camera;
storing, in the memory, registration information relating to a plurality of biological features obtained from a biological region of an image of each person;
dividing the biological region of the image obtained by the camera into a plurality of regions to execute biometric authentication of an individual;
calculating, by the processor, a first similarity for a first feature of the plurality of biological features of the image with an authentication image of a different individual stored in the memory;
calculating, by the processor, a second similarity of a second feature of the plurality of biological features of the image at one of the plurality of regions that has a highest similarity with the first feature; and
combining, by the processor, the first similarity and the second similarity to obtain a final similarity;
determine if the final similarity is greater than a threshold;
on a condition that the final similarity is greater than the threshold, grant registration to the individual and save the registration information and any corresponding registration candidate data in the memory; and on a condition that the final similarity is less than the threshold, deny the registration to the individual and delete the registration information from the memory, and wherein a plurality of biological features obtained from the individual and a plurality of biological features obtained from the different individual have a lower pattern correlation than if the authentication image was obtained from the individual.

\* \* \* \* \*